US011876585B1

(12) United States Patent
Bachu et al.

(10) Patent No.: US 11,876,585 B1
(45) Date of Patent: Jan. 16, 2024

(54) MODIFIED SINGULAR-VALUE DECOMPOSITION SIGNAL-TO-LEAKAGE RATIO PRECODING FOR MULTIPLE-INPUT AND MULTIPLE-OUTPUT SYSTEMS

(71) Applicant: QUALCOMM Incorporated, San Diego, CA (US)

(72) Inventors: Raja Sekhar Bachu, Kendall Park, NJ (US); Luca Blessent, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/934,042

(22) Filed: Sep. 21, 2022

(51) Int. Cl.
*H04B 7/06* (2006.01)
*H04B 7/0456* (2017.01)
*H04L 5/00* (2006.01)

(52) U.S. Cl.
CPC ......... *H04B 7/0456* (2013.01); *H04L 5/0051* (2013.01); *H04B 7/0617* (2013.01)

(58) Field of Classification Search
CPC ..... H04W 72/23; H04W 24/02; H04W 72/21; H04W 24/08; H04W 72/541; H04W 24/10; H04W 52/42; H04L 5/0048; H04L 5/0007; H04L 25/0202; H04L 25/0226; H04L 5/0037; H04L 5/0023; H04B 7/0456; H04B 7/0626; H04B 7/00; H04B 7/022; H04B 7/0854; H04B 7/0452; H04B 7/0617
USPC ........................................................ 375/267
See application file for complete search history.

(56) References Cited

U.S. PATENT DOCUMENTS

| 7,974,349 | B2 | 7/2011 | Nam et al. | |
|---|---|---|---|---|
| 2015/0244432 | A1* | 8/2015 | Wang | H04B 7/0417 375/267 |
| 2019/0305834 | A1* | 10/2019 | Fakoorian | H04B 7/00 |
| 2021/0359731 | A1* | 11/2021 | Sahraei | H04B 7/0465 |
| 2022/0416993 | A1* | 12/2022 | Berger | H04L 7/042 |

OTHER PUBLICATIONS

Bobrov E., et al., "Adaptive Regularized Zero-Forcing Precoding for Massive MIMO Systems with Multi-Antenna Users", arXiv:2107.00853v4 [cs.IT] Jan. 31, 2022, 25 Pages.

* cited by examiner

*Primary Examiner* — Eva Y Puente
(74) *Attorney, Agent, or Firm* — Procopio, Cory, Hargreaves & Savitch LLP

(57) ABSTRACT

A network node may decompose a first channel of a first user equipment (UE) to calculate a first set of singular-value decomposition (SVD) values and may decompose a second channel of a second UE to calculate a second set of SVD values. The first SVD values may include a first matrix having left eigenvectors, a second matrix having diagonal eigenvalues, and a third matrix having a first Hermitian of right eigenvectors. The second SVD values may include a fourth matrix having left eigenvectors, a fifth matrix having diagonal eigenvalues, and a sixth matrix having a second Hermitian of right eigenvectors. The network node may communicate using a beamforming weight for a signal-to-leakage ratio (SLR) precoder matrix associated with the first UE and the second UE based on the third matrix and the sixth matrix and not based on the second matrix and the fifth matrix.

30 Claims, 10 Drawing Sheets

MODIFIED SINGULAR-VALUE DECOMPOSITION SIGNAL-TO-LEAKAGE RATIO PRECODING FOR MULTIPLE-INPUT AND MULTIPLE-OUTPUT SYSTEMS

TECHNICAL FIELD

The present disclosure relates generally to communication systems, and more particularly, to a system for signal-to-leakage ratio (SLR) precoding.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a network node are provided. The apparatus may decompose a first channel of a first user equipment (UE) to calculate a first set of singular-value decomposition (SVD) values and may decompose a second channel of a second UE to calculate a second set of SVD values. The first SVD values may include a first matrix having left eigenvectors, a second matrix having diagonal eigenvalues, and a third matrix having a first Hermitian of right eigenvectors. The second SVD values may include a fourth matrix having left eigenvectors, a fifth matrix having diagonal eigenvalues, and a sixth matrix having a second Hermitian of right eigenvectors. The network node may communicate using a beamforming weight for a signal-to-leakage ratio (SLR) precoder matrix associated with the first UE and the second UE based on the third matrix and the sixth matrix and not based on the second matrix and the fifth matrix.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
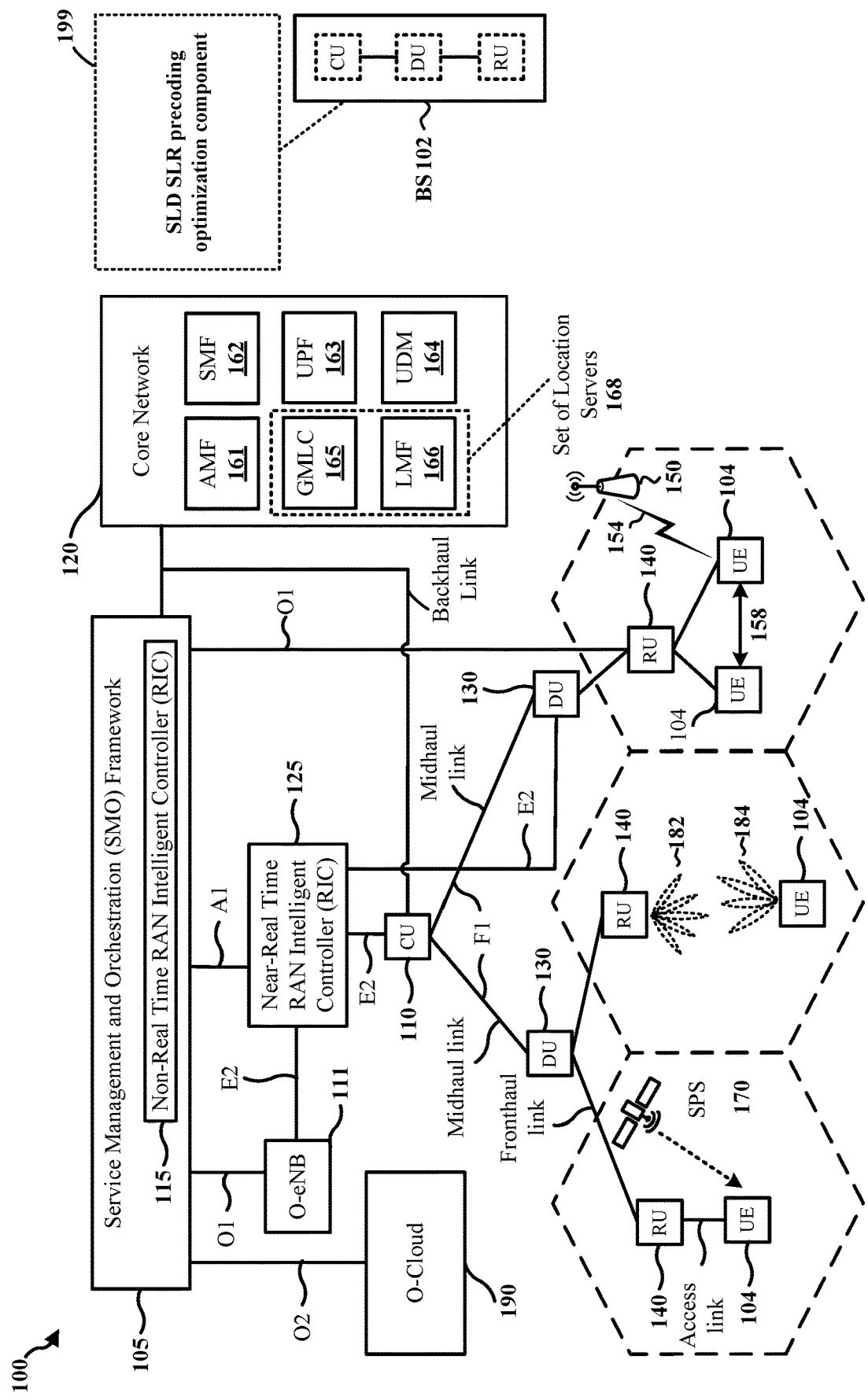
FIG. 1 is a diagram illustrating an example of a wireless communications system and an access network.

A network node may be configured to decompose a channel using singular-value decomposition (SVD) on a channel measured on sounding reference signal (SRS) from a user equipment (UE). An SRS may have eigenvalues and eigenvectors of the channel incorporated in the signal. The network node may calculate signal-to-leakage (SLR) beamforming weights using eigenvalues and eigenvectors obtained using SVD on the SRS. However, a UE may not be able to transmit an SRS to the network node, for example if the UE is in a power-limited region or the UE has a poor signal-to-noise ratio (SNR) with respect to the network node. The UE may be able to transmit other signals to the network node, such as precoding matrix indicator (PMI) feedback in response to a channel state indicator (CSI) reference signal (CSI-RS) transmitted by the network node. The PMI feedback may be a type I or a type II feedback. While PMI feedback may indicate eigenvectors, the PMI feedback may not indicate eigenvalues. In such aspects, the network node may be configured to calculate SLR beamforming weights using PMI feedback in place of eigenvalues without using eigenvalue s.

A network node may decompose a first channel of a first UE to calculate a first set of SVD values and may decompose a second channel of a second UE to calculate a second set of SVD values. The first SVD values may include a first matrix having left eigenvectors, a second matrix having diagonal eigenvalues, and a third matrix having a first Hermitian of right eigenvectors. The second SVD values may include a fourth matrix having left eigenvectors, a fifth matrix having diagonal eigenvalues, and a sixth matrix having a second Hermitian of right eigenvectors. The network node may communicate using a beamforming weight for a signal-to-leakage ratio (SLR) precoder matrix associated with the first UE and the second UE based on the third matrix and the sixth matrix and not based on the second matrix and the fifth matrix. The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Affiance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (MC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140. Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (0-Cloud) 190) to perform network element life cycle management (such as to instantiate virtualized network elements) via a cloud computing platform interface (such as an 02 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (0-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT MC 125. The Non-RT RIC 115 may be coupled to or communicate with (such as via an AI interface) the Near-RT RIC 125. The Near-RT MC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as AI policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TB S), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 102 may be configured to have a singular-value decomposition (SVD) signal-to-leakage ratio (SLR) precoding optimization component 199 configured to decompose a first channel of a first UE to calculate a first set of SVD values and may decompose a second channel of a second UE to calculate a second set of SVD values. The first SVD values may include a first matrix having left eigenvectors, a second matrix having diagonal eigenvalues, and a third matrix having a first Hermitian of right eigenvectors. The second SVD values may include a fourth matrix having left eigenvectors, a fifth matrix having diagonal eigenvalues, and a sixth matrix having a second Hermitian of right eigenvectors. The precoding optimization component 199 may be configured to communicate using a beamforming weight for an SLR precoder matrix associated with the first UE and the second UE based on the third matrix and the sixth matrix and not based on the second matrix and the fifth matrix. Although the following description may be focused on multi-user (MU) MIMO (MU-MIMO), the concepts described herein may be applicable to other areas, such as SU-MIMO. Although the following description may be focused on 5G NR, the concepts described herein may be applicable to other similar areas, such as LTE, LTE-A, CDMA, GSM, and other wireless technologies.

Figure 2:
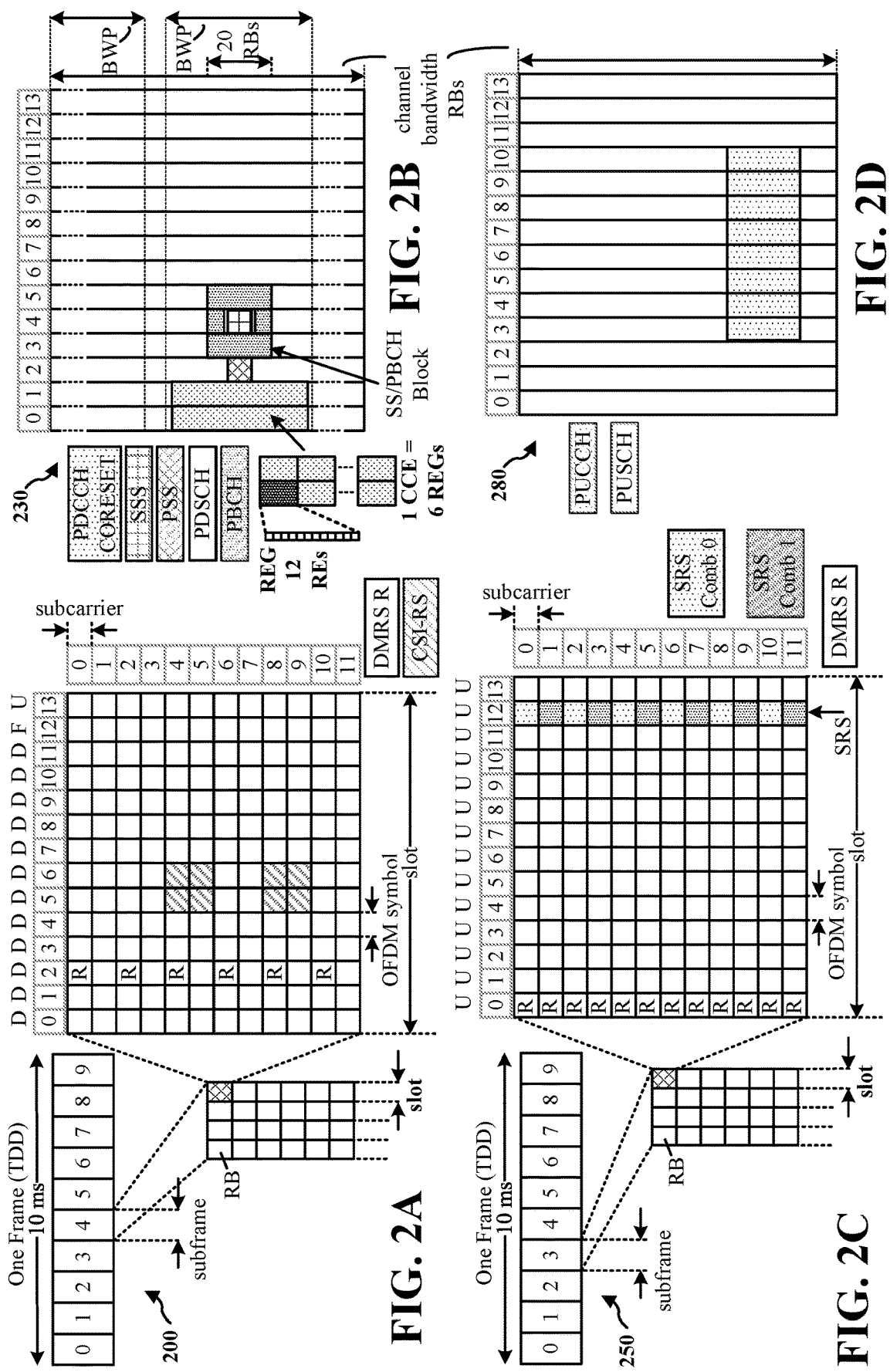
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2^$\mu$ slots/subframe. The subcarrier spacing may be equal to $2^{\mu*}$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
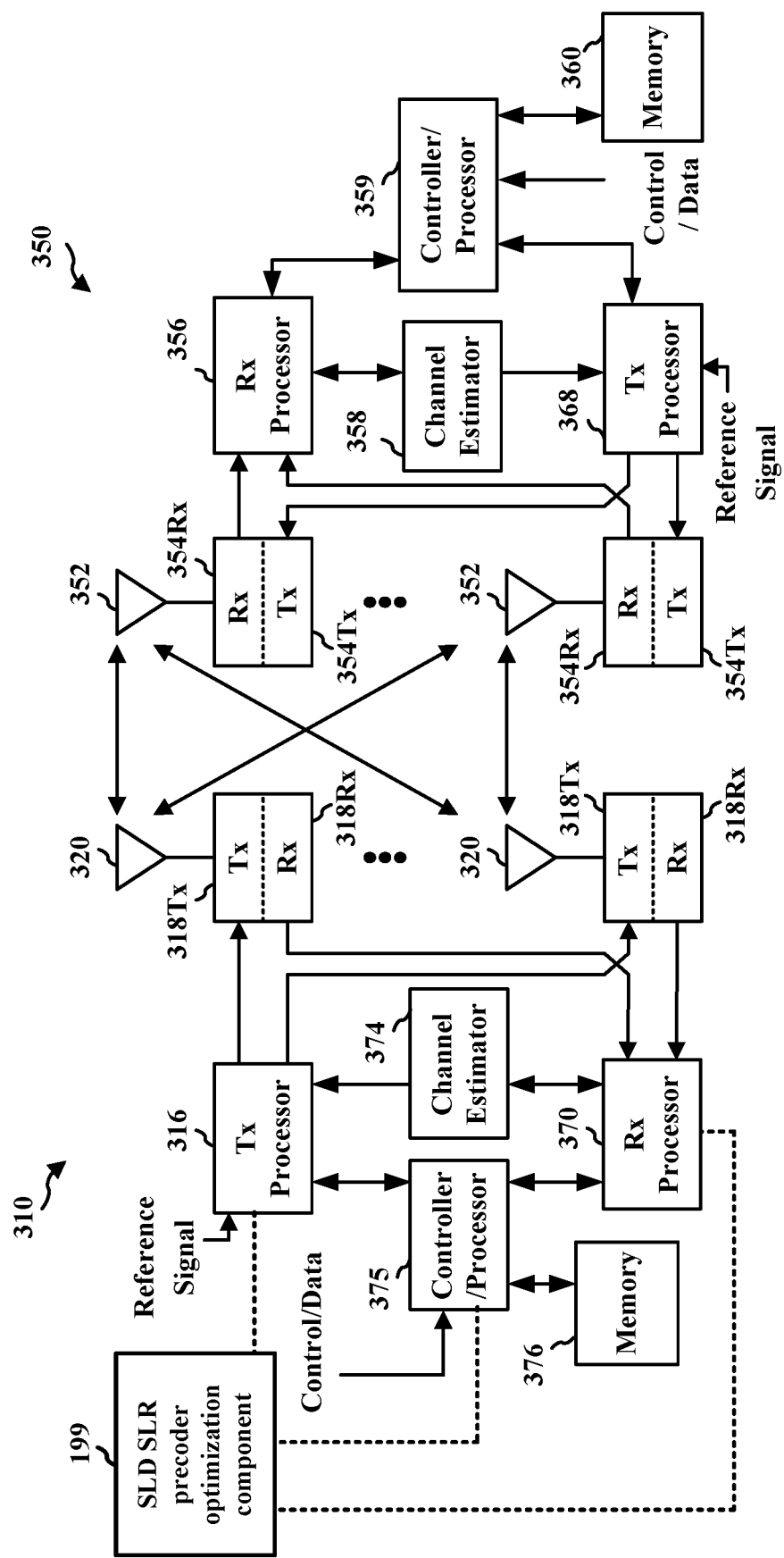
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BP SK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization. Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 316, the Rx processor 370, and the controller/processor 375 may be configured to perform aspects in connection with the SLD SLR precoding optimization component 199 of FIG. 1.

Figure 4:
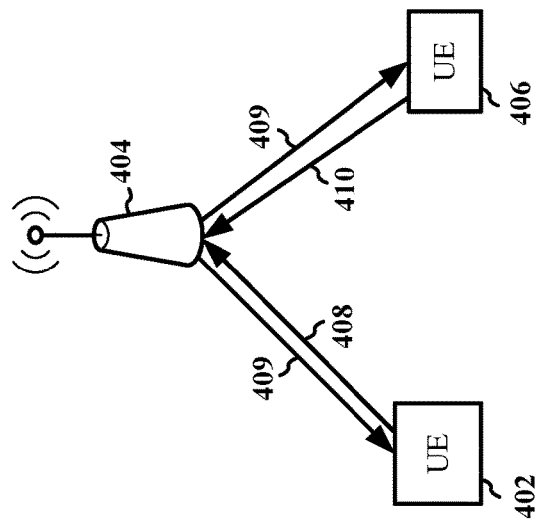
FIG. 4 is a diagram illustrating an example of a network node configured to perform precoding on transmissions to a plurality of UEs.

Precoding may be used for wireless communication, such as for transmissions between a UE and a base station. In some aspects, precoding may be based on a transmitter knowing channel state information. As an example, a transmitter may send a sounding signal or reference signal, which may be a coded message, to the receiver. Each receiver may respond by sending their CSI to the transmitter. In some aspects, the transmitter may receive a sounding reference signal from a receiver to determine the channel state information. The transmitter may use the CSI to set a precoding matrix for subsequent data transmissions. FIG. 4 is a diagram 400 illustrating an example of a network node 404 configured to perform precoding on transmissions to a plurality of UEs, such as the UE 402 and the UE 406. While two UEs are shown, the network node 404 may be configured to perform precoding on transmissions to any number of UEs, such as three, four, or more UEs. The network node 404 apply signal-to-leakage (SLR) minimization on channels equalized the UE 402 and the UE 406. The channels may not be normalized and may have the eigenvalues of the channels incorporated in them. The network node may measure a sounding reference signal (SRS) from a UE to estimate the eigenvalues of the channel. For example, the UE 402 may transmit an SRS as the signal 408 to the network node 404, and the UE 406 may transmit an SRS as the signal 410 to the network node 404.

The network node 404 may receive the SRS signal and perform a decomposition, such as singular-value decomposition (SVD) on the channel to estimate the eigenvalue s and eigenvectors of the channel. For example, the channel to UE 402 may be represented by $H_1=U_1S_1V_1^H$, where $H_1$ may represent the channel between the network node 404 to UE 402, $U_1$ may represent a matrix of the left eigenvectors (with UE 402) of the channel, $S_1$ may represent a diagonal matrix of the eigenvalues of the channel, $V_1$ may represent a matrix of the right eigenvectors (with network node 404) of the channel, and $V_1^H$ may represent a Hermitian (transposed and conjugated) of $V_1$. S 1 may represent the fast trading aspects of the channel of UE 402. $V_1$ may represent the spatial signature of the channel of UE 402. Similarly, the channel to UE 406 may be represented by $H_2=U_2S_2V_2^H$, where $H_2$ may represent the channel between the network node 404 to UE 406, $U_2$ may represent a matrix of the left eigenvectors (with UE 406) of the channel, $S_2$ may represent a diagonal matrix of the eigenvalues of the channel, $V_2$ may represent a matrix of the right eigenvectors (with network node 404) of the channel, and $V_2^H$ may represent a Hermitian of $V_2$. $S_2$ may represent the fast trading aspects of the channel of UE 406.

V 2 may represent the spatial signature of the channel of UE 406. $U_1$, $V_1$, $U_2$, and $V_2$ may be orthogonal matrices. The network node 404 may estimate the equivalent channel with UE 402 to be $H_{eq,1}=S_1V_1^H$ since the network node 404 may assume that the UE 402 is using a receiver of $U_1^H$, which will become an identity when combined with $U_1$. Similarly, the network node 404 may estimate the equivalent channel with UE 406 to be $H_{eq,2}=S_2V_2^H$, because the network node 404 may assume that the UE 406 is using a receiver of $U_2^H$, which will become an identity when combined with $U_2$.

The network node 404 may then estimate a combined equivalent channel with both the UE 402 and the UE 406 to be $H_{comb}=[H_{eq,1}; H_{eq,2}]$, or a simple concatenation of $H_{eq,1}$ and $H_{eq,2}$. The network node 404 may then calculate an SLR beamforming weight for the combined channel to be $W_{comb}=H_{comb}^H (H_{comb} H_{comb}^H+N_0I)^{-1}$, where $H_{comb}^H$ may be a Hermitian of $H_{comb}$, $N_0$ may be the estimated noise with UE 402 and UE 406, and I may be an identity matrix. The network node 404 may then perform SLR precoding on transmissions to the UE 402 and the UE 406, such as the signal 409 to both the UE 402 and the UE 406, using the calculated SLR beamforming weight.

In some aspects, the network node 404 may be unable to receive SRS from the UE 402 and/or the UE 406. For example, the UE 402 and/or the UE 406 may be located in a power-limited region and may not be able to transmit an SRS of sufficient power within the power-limited region. In another example, the UE 402 and/or the UE 406 may have a poor signal-to-noise ratio (SNR) with respect to the network node 404, limiting the efficacy of an SRS transmitted to the network node 404. In another example, the UE 402 and/or the UE 406 may operate in frequency division duplex (FDD) mode. If the network node 404 is unable to receive SRS from the UE 402 and/or the UE 406, the network node 404 may instead receive PMI feedback from the UE 402 and/or the UE 406 based on a channel state indicator (CSI) reference signal (CSI-RS) transmitted by the network node 404. However, the network node 404 may not be able to estimate eigenvalues based on PMI feedback. Instead, the network node 404 may be able to estimate eigenvectors based on PMI feedback, but may not be able to estimate eigenvalues based on the PMI feedback. For example, the network node 404 may estimate an eigenvector from a DFT grid of beams standardized in NR based on PMI feedback received from the UE 402 or the UE 406.

Figure 5:
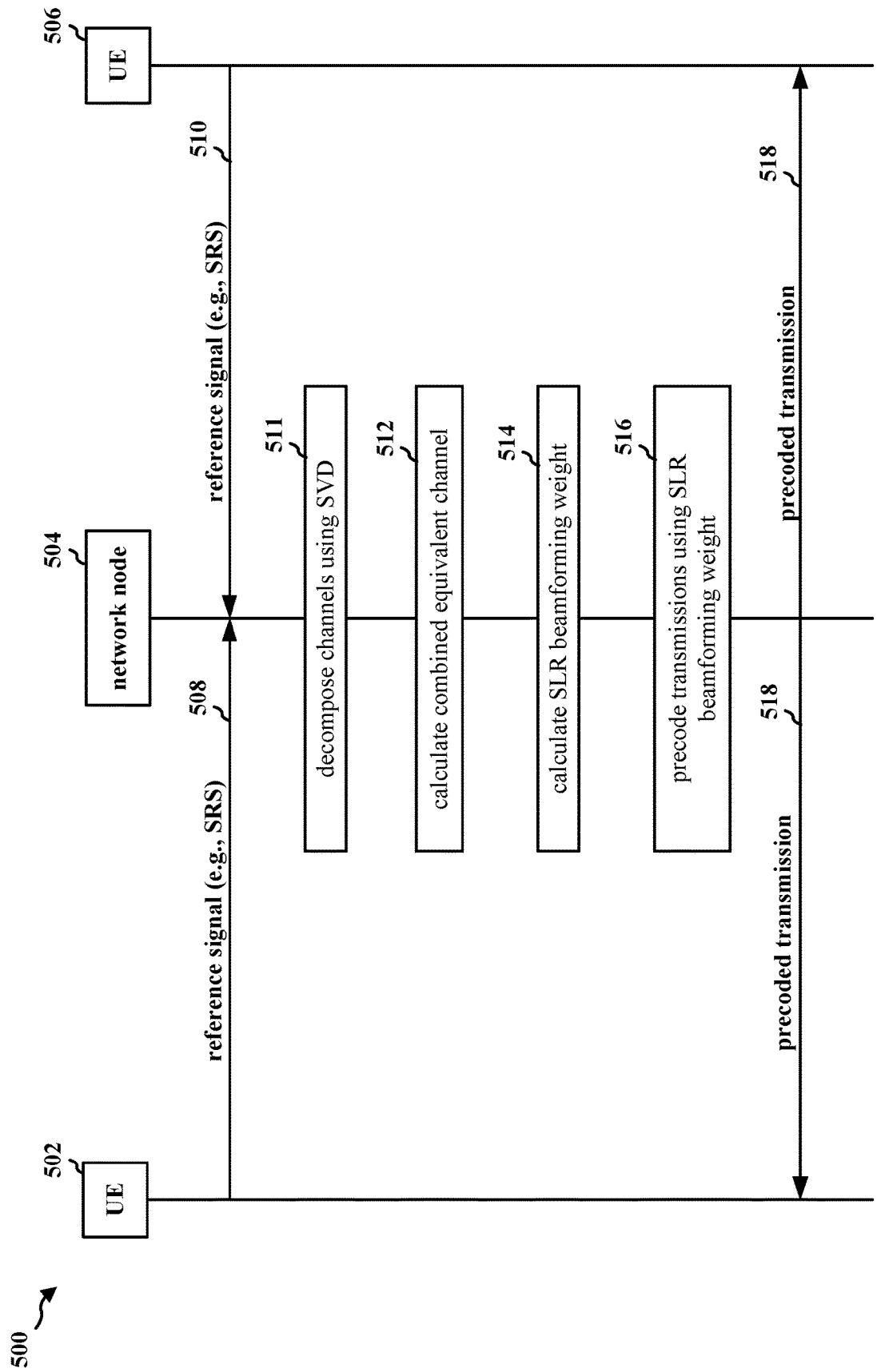
FIG. 5 is a connection flow diagram illustrating an example of a network node configured to perform precoding on transmissions to a plurality of UEs.

If the network node 404 is not able to receive SRS from the UE 402, the network node 404 may not be able to estimate the equivalent channel with UE 402 to be $H_{eq,1}=S_1V_1^H$, since the values of $S_1$ (matrix with eigenvalues) may not be known. Similarly, if the network node 404 is not able to receive SRS from the UE 406, the network node 404 may not be able to estimate the equivalent channel with UE 406 to be $H_{eq,2}=S_2V_2^H$, since the values of S 2 may not be known. Instead, the network node 404 may decompose a first channel of the UE 402 to calculate a first set of SVD values (e.g., $H_1=U_1S_1V_1^H$) and may decompose a second channel of the UE 406 to calculate a second set of SVD values (e.g., $H_2=U_2S_2V_2^H$). The first SVD values may include a first matrix having left eigenvectors (e.g., $U_1$), a second matrix having diagonal eigenvalues (e.g., $S_1$), and a third matrix having a first Hermitian of right eigenvectors (e.g., $V_1^H$). The third matrix may be associated with a spatial signature of the UE 402. The second SVD values may include a fourth matrix having left eigenvectors (e.g., $U_2$), a fifth matrix having diagonal eigenvalues (e.g., $S_2$), and a sixth matrix having a second Hermitian of right eigenvectors (e.g., $V_2^H$). The sixth matrix may be associated with a spatial signature of the UE 406. The network node may communicate using a beamforming weight (e.g., $W_{comb}=H_{comb}^H(H_{comb}H_{comb}^H N_0 I)^{-1}$) for a SLR precoder matrix associated with the first UE and the second UE based on the third matrix and the sixth matrix and not based on the second matrix and the fifth matrix (e.g., $H_{comb}=[H_{eq,1};H_{eq,2}]$ where $H_{eq,1}=V_1^H$ and $H_{eq,2}=V_2^H$). In other words, the beamforming weights may be based on the spatial signature of the UE 402 and the UE 406 and not on the fast trading aspects of the UE 402 and the UE 406. FIG. 5 is a connection flow diagram 500 illustrating an example of a network node 504 configured to perform precoding on transmissions to a plurality of UEs, such as the UE 502 and the UE 506. While two UEs are shown, the network node 404 may be configured to perform precoding on transmissions to any number of UEs, such as three, four, or more UEs. The UE 502 may transmit a reference signal 508 to the network node 504. The UE 506 may transmit a reference signal 510 to the network node 504. The reference signals may be transmitted at overlapping times or at different times. The reference signal 508 and/or 510 may be a signal that may be decomposed to obtain eigenvalues and/or eigenvectors of the channel, such as an SRS or PMI feedback. An SRS may indicate one or more eigenvalues and eigenvectors associated with the channel between the network node and the UE. PMI feedback may indicate one or more eigenvectors associated with the channel between the network node and the UE.

At 511, the network node 504 may decompose the channels using SVD. In one aspect, the network node 504 may decompose the reference signal 508 using SVD as $H_1=U_1 S_1 V_1^H$, where $H_1$ may represent the channel between the network node 504 and UE 502, $U_1$ may represent a matrix of the left eigenvectors (with UE 502) of the channel, $S_1$ may represent a diagonal matrix of the eigenvalues of the channel, $V_1$ may represent a matrix of the right eigenvectors (with network node 504) of the channel, and $V_1^H$ may represent a Hermitian (transposed and conjugated) of $V_1$. In another aspect, the network node 504 may decompose the reference signal 510 using SVD as $H_2=U_2 S_2 V_2^H$, where $H_2$ may represent the channel between the network node 504 and the UE 506, $U_2$ may represent a matrix of the left eigenvectors (with UE 506) of the channel, $S_2$ may represent a diagonal matrix of the eigenvalues of the channel, $V_2$ may represent a matrix of the right eigenvectors (with network node 504) of the channel, and $V_2^H$ may represent a Hermitian of $V_2$. $U_1$, $V_1$, $U_2$, and $V_2$ may be orthogonal matrices. In some aspects, the network node 504 may be unable to obtain the values of $U_1$ and/or $S_1$ based on the reference signal 508. In some aspects, the network node 504 may be unable to obtain the values of $U_2$ and/or $S_2$ based on the reference signal 510. For SRS measurements, the eigenvalues of the channel may be incorporated in the SRS. For PMI feedback, the precoding matrix corresponding to the PMI feedback may be used to determine eigenvectors associated with the channel.

At 512 the network node 504 may calculate a combined equivalent channel for the UE 502 and the UE 506. In one aspect, the network node 504 may calculate the equivalent channel between the network node 504 and the UE 502 as $H_{eq,1}=V_1^H$ In another aspect, the network node 504 may calculate the equivalent channel between the network node 504 and the UE 506 as $H_{eq,2}=V_2^H$. In other words, the network node 504 may use the base station side eigenvectors in place of $H_{eq}$ for measurements as the input to an SLR operation. The network node 504 may calculate the combined equivalent channel for the UE 502 and the UE 506 as $H_{comb}=[H_{eq,1};H_{eq,2}]$, or a concatenation of the matrix $V_1^H$ and the matrix $V_2^H$. In this manner, the precoding matrices generated from measurements that derive eigenvalues, such as SRS measurements or CSI-RS measurements, may be treated in the same way, and the correlations between the precoding vectors of different user equipment may be considered with no reference to the eigenvalues.

At 514, the network node 504 may calculate an SLR beamforming weight for the combined equivalent channel. In one aspect, the network node 504 may calculate the SLR beamforming weight between the network node and the UE 502 and the UE 506 as $W_{comb}=H_{comb}^H(H_{comb}H_{comb}^H N_0 I)^{-1}$, where $H_{comb}^H$ may be a Hermitian of $H_{comb}$, $N_0$ may be the estimated noise with UE 502 and UE 506, and I may be an identity matrix.

At 516, the network node 504 may precode transmissions with the UE 502 and the UE 506 using the calculated SLR beamforming weight. The network node 504 may then transmit one or more precoded transmissions 518 to the UE 502 and the UE 506 using the calculated SLR beamforming weight. As an example, the transmissions may be MIMO transmissions.

While two UEs are shown in connection flow diagram 500, the network node 504 may be configured to calculate the SLR beamforming weight for transmissions to more than two UEs, for example by calculating a combined equivalent channel between three, four, or even five UEs.

Figure 6:
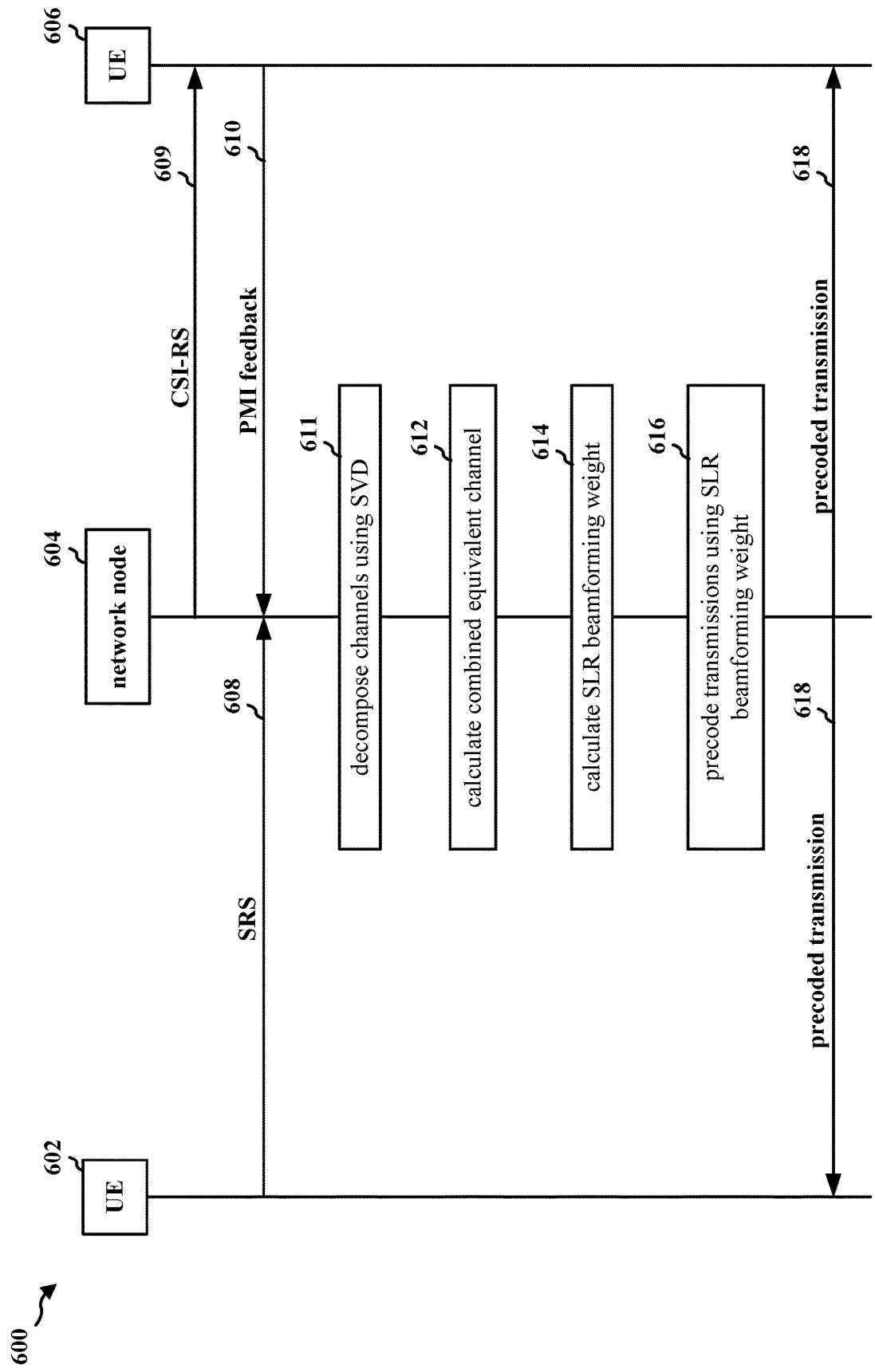
FIG. 6 is another connection flow diagram illustrating an example of a network node configured to perform precoding on transmissions to a plurality of UEs.

FIG. 6 is a connection flow diagram 600 illustrating an example of a network node 604 configured to perform precoding on transmissions to a plurality of UEs, such as the UE 602 and the UE 606. While two UEs are shown, the network node 404 may be configured to perform precoding on transmissions to any number of UEs, such as three, four, or more UEs. The UE 602 may transmit an SRS 608 to the network node 604. The network node 604 may transmit a CSI-RS 609 to the UE 606. The UE 606 may receive the CSI-RS 609. In response, the UE 606 may transmit PMI feedback 610 to the network node 604. The network node 604 may decompose the SRS 608 to obtain eigenvectors associated with the channel between the network node 604 and the UE 602. The network node 604 may use the precoding matrix associated with the PMI feedback 610 to obtain eigenvectors associated with the channel between the network node 604 and the UE 606.

At 611, the network node 604 may decompose the channels using SVD. In one aspect, the network node 604 may decompose the SRS 608 using SVD as $H_1=U_1 S_1 V_1^H$, where $H_1$ may represent the channel between the network node 604 and UE 602, $U_1$ may represent a matrix of the left eigenvectors (with UE 602) of the channel, $S_1$ may represent a diagonal matrix of the eigenvalues of the channel, $V_1$ may represent a matrix of the right eigenvectors (with network node 604) of the channel, and $V_1^H$ may represent a Hermitian (transposed and conjugated) of $V_1$. In another aspect, the network node 604 may decompose the PMI feedback 610 using SVD as $H_2=U_2 S_2 V_2^H$, where $H_2$ may represent the channel between the network node 604 and the UE 606, $U_2$ may represent a matrix of the left eigenvectors (with UE 606) of the channel, $S_2$ may represent a diagonal matrix of the eigenvalues of the channel, $V_2$ may represent a matrix of the right eigenvectors (with network node 604) of the channel, and $V_2^H$ may represent a Hermitian of $V_2$. $U_1$, $V_1$, $U_2$, and $V_2$ may be orthogonal matrices. In some aspects, the network node 604 may be unable to obtain the values of $U_1$ based on the SRS 608. In some aspects, the network node 604 may be unable to obtain the values of $U_2$ and $S_2$ based on the PMI feedback 610.

At 612 the network node 604 may calculate a combined equivalent channel for the UE 602 and the UE 606. In one aspect, the network node 604 may calculate the equivalent channel between the network node 604 and the UE 602 as $H_{eq,1}=V_1^H$ In another aspect, the network node 604 may calculate the equivalent channel between the network node 604 and the UE 606 as $H_{eq,2}=V_2^H$. In other words, the network node 604 may use the base station side eigenvectors in place of H ea for measurements as the input to an SLR operation. The network node 604 may calculate the combined equivalent channel for the UE 602 and the UE 606 as $H_{comb}=[H_{eq,1}; H_{eq,2}]$ or a concatenation of the matrix V H and the matrix VP. In this manner, the precoding matrices generated from measurements that derive eigenvalues, such as SRS measurements or CSI-RS measurements, may be treated in the same way, and the correlations between the precoding vectors of different user equipment may be considered with no reference to the eigenvalues. Since the network node 604 does not use the $S_1$ matrix or the $S_2$ matrix to calculate the combined equivalent channel for the UE 602 and the UE 606, the network node 604 may combine $H_{eq,1}$ and $H_{eq,2}$. At 614, the network node 604 may calculate an SLR beamforming weight for the combined equivalent channel. In one aspect, the network node 604 may calculate the SLR beamforming weight between the network node and the UE 602 and the UE 606 as $W_{comb}=H_{comb}(H_{comb}H_{comb}^H N_0I)^{-1}$, where $H_{comb}^H$ may be a Hermitian of $H_{comb}$, $N_0$ may be the estimated noise with UE 602 and UE 606, and I may be an identity matrix.

At 616, the network node 604 may precode transmissions with the UE 602 and the UE 606 using the calculated SLR beamforming weight. The network node 604 may then transmit one or more precoded transmissions 618 to the UE 602 and the UE 606 using the calculated SLR beamforming weight.

Figure 7:
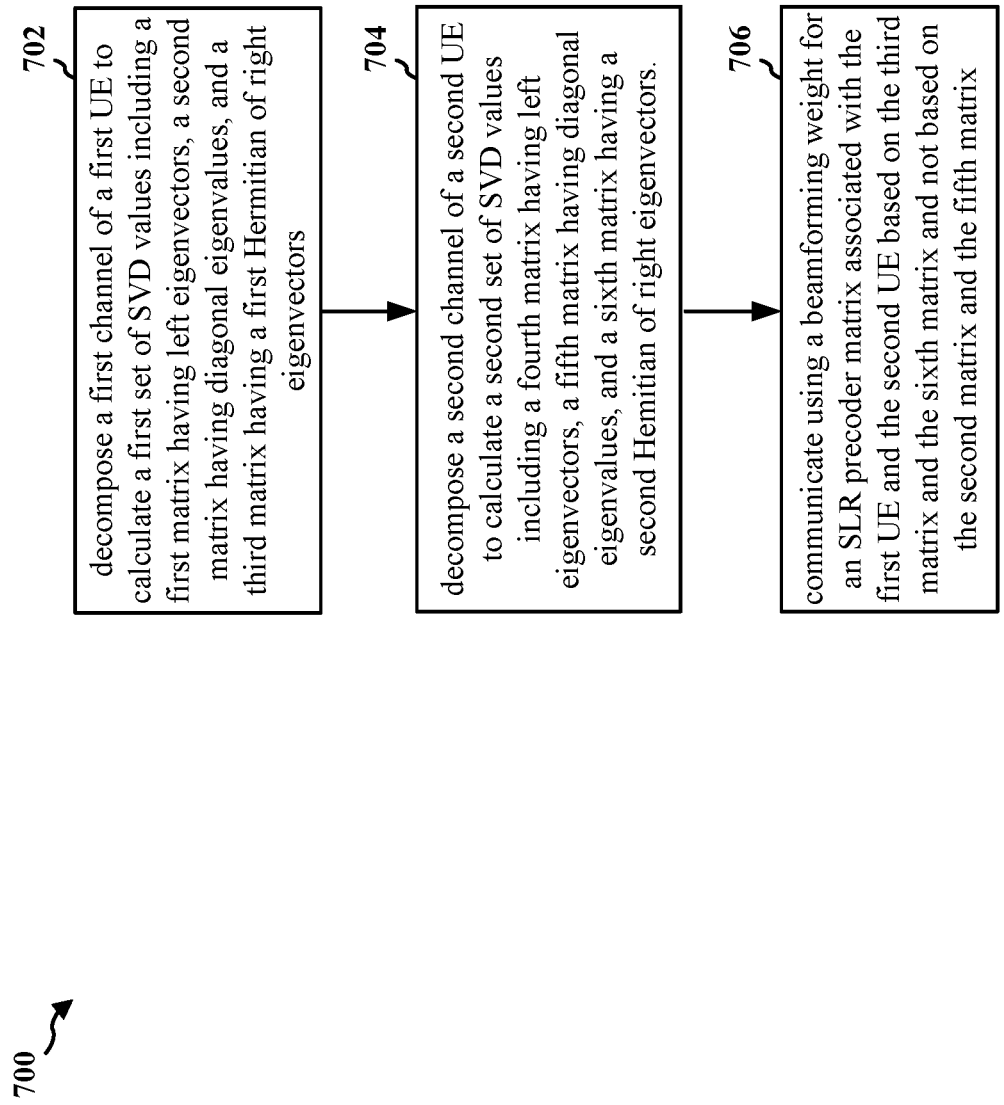
FIG. 7 is a flowchart of a method of wireless communication.

FIG. 7 is a flowchart 700 of a method of wireless communication. The method may be performed by a network node (e.g., the base station 102; the base station 310; the network node 404, the network node 504, the network node 604; the network entity 902, the network entity 1060). At 702, the network node may decompose a first channel of a first UE to calculate a first set of SVD values. The first set of SVD values may include a first matrix having left eigenvectors, a second matrix having diagonal eigenvalues, and a third matrix having a first Hermitian of right eigenvectors. For example, 702 may be performed by the network node 504 in FIG. 5, which may decompose a channel of the UE 502 to calculate a first set of SVD values, such as $H_1=U_1S_1V_1^H$. The first set of SVD values may include a first matrix having left eigenvectors, such as $U_1$, a second matrix having diagonal eigenvalues, such as $S_1$, and a third matrix having a first Hermitian of right eigenvectors, such as $V_1^H$. Moreover, 702 may be performed by the component 199 in FIG. 9 or in FIG. 10. At 704, the network node may decompose a second channel of a second UE to calculate a second set of SVD values. The second set of SVD values may include a fourth matrix having left eigenvectors, a fifth matrix having diagonal. For example, 704 may be performed by the network node 504 in FIG. 5, which may decompose a second channel of the UE 506 to calculate a second set of SVD values, such as $H_2=U_2S_2V_2^H$. The second set of SVD values may include a fourth matrix having left eigenvectors, such as $U_2$, a fifth matrix having diagonal eigenvalues, such as $S_2$, and a sixth matrix having a second Hermitian of right eigenvectors, such as $V_2^H$. Moreover, 704 may be performed by the component 199 in FIG. 9 or in FIG. 10.

At 706, the network node may communicate using a beamforming weight for an SLR precoder matrix associated with the first UE and the second UE based on the third matrix and the sixth matrix and not based on the second matrix and the fifth matrix. For example, 706 may be performed by the network node 504 in FIG. 5, which may communicate with the UE 502 and the UE 506 using a beamforming weight for an SLR precoder matrix, such as $W_{comb}=H_{comb}^H (H_{comb} H_{comb}^H+N_0I)^{-1}$, associated with the UE 502 and the UE 506 based on the third matrix and the sixth matrix and not based on the second matrix and the fifth matrix, such as $H_{comb}=[H_{eq,1}; H_{eq,2}]$ where $H_{eq,1}=V_1^H$ and $H_{eq,2}=V_2^H$. Moreover, 706 may be performed by the component 199 in FIG. 9 or in FIG. 10.

Figure 8:
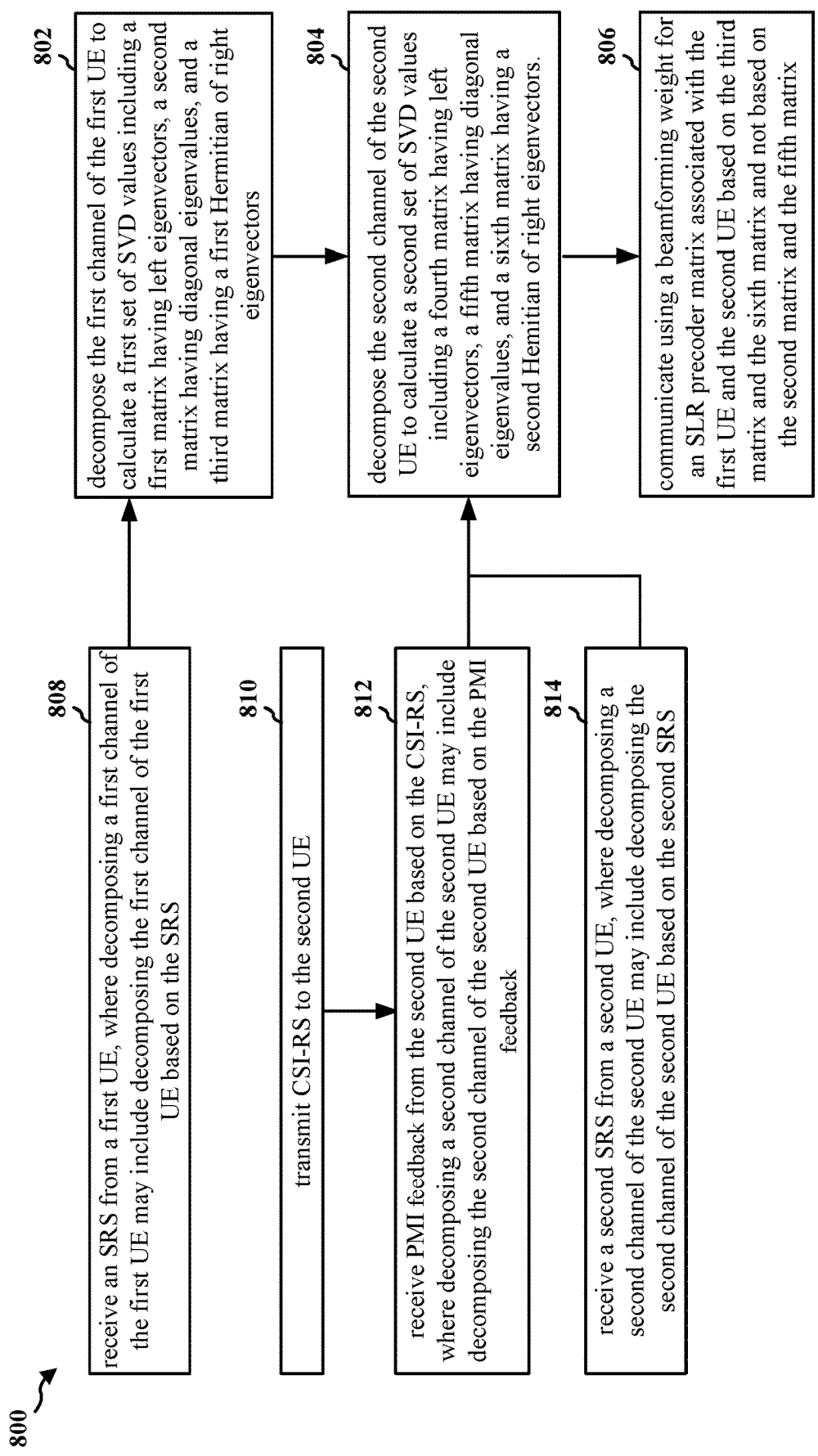
FIG. 8 is another flowchart of a method of wireless communication.

FIG. 8 is a flowchart 800 of a method of wireless communication. The method may be performed by a network node (e.g., the base station 102; the base station 310; the network node 404, the network node 504, the network node 604; the network entity 902, the network entity 1060).

At 808, the network node may receive an SRS from a first UE. Decomposing a first channel of the first UE may include decomposing a first channel of the first UE based on the SRS. For example, 808 may be performed by the network node 504 in FIG. 5, which may receive the reference signal 508 as an SRS from the UE 502. The network node 504 may, at 511, decompose a channel of the UE 502 based on the reference signal 508, which may be an SRS. 808 may also be performed by the network node 604 in FIG. 6, which may receive an SRS 608 from the UE 602. The network node 604 may, at 611, decompose a channel of the UE 602 based on the SRS 608. Moreover, 808 may be performed by the component 199 in FIG. 9 or in FIG. 10. At 810, the network node may transmit CSI-RS to the second UE. For example, 810 may be performed by the network node 604 in FIG. 6, which may transmit CSI-RS 609 to the UE 606. Moreover, 810 may be performed by the component 199 in FIG. 9 or in FIG. 10.

At 812, the network node may receive PMI feedback from the second UE based on the CSI-RS. Decomposing a second channel of the second UE may include decomposing the second channel of the second UE based on the PMI feedback. For example, 812 may be performed by the network node 604 in FIG. 6, which may receive PMI feedback 610 from the UE 606. The network node 604 may, at 611, decompose a channel of the UE 606 based on the PMI feedback 610. Moreover, 812 may be performed by the component 199 in FIG. 9 or in FIG. 10.

At 814, the network node may receive a second SRS from a second UE. Decomposing a second channel of the second UE may include decomposing the second channel of the second UE based on the second SRS. For example, 814 may be performed by the network node 504 in FIG. 5, which may receive the reference signal 510 as an SRS from the UE 506. The network node 504 may, at 511, decompose a second channel of the UE 506 based on the reference signal 510, which may be an SRS. Moreover, 814 may be performed by the component 199 in FIG. 9 or in FIG. 10.

At 802, the network node may decompose a first channel of a first UE to calculate a first set of SVD values. The first set of SVD values may include a first matrix having left eigenvectors, a second matrix having diagonal eigenvalues, and a third matrix having a first Hermitian of right eigenvectors. For example, 802 may be performed by the network node 504 in FIG. 5, which may, at 511, decompose a channel of the UE 502 to calculate a first set of SVD values, such as $H_1=U_1S_1V_1^H$. The first set of SVD values may include a first matrix having left eigenvectors, such as $U_1$, a second matrix having diagonal eigenvalues, such as $S_1$, and a third matrix having a first Hermitian of right eigenvectors, such as $V_1^H$. 802 may be performed by the network node 604 in FIG. 6, which may, at 611, decompose a channel of the UE 602 to calculate a first set of SVD values, such as $H_1=U_1S_1V_1^H$. The first set of SVD values may include a first matrix having left eigenvectors, such as $U_1$, a second matrix having diagonal eigenvalues, such as $S_1$, and a third matrix having a first Hermitian of right eigenvectors, such as $V_1^H$. Moreover, 802 may be performed by the component 199 in FIG. 9 or in FIG. 10.

At 804, the network node may decompose a second channel of a second UE to calculate a second set of SVD values. The second set of SVD values may include a fourth matrix having left eigenvectors, a fifth matrix having diagonal. For example, 804 may be performed by the network node 504 in FIG. 5, which may, at 511, decompose a channel of the UE 506 to calculate a second set of SVD values, such as $H_2=U_2S_2V_2^H$. The second set of SVD values may include a fourth matrix having left eigenvectors, such as $U_2$, a fifth matrix having diagonal eigenvalues, such as $S_2$, and a sixth matrix having a second Hermitian of right eigenvectors, such as $V_2^H$. 804 may also be performed by the network node 604 in FIG. 6, which may, at 611, decompose a channel of the UE 606 to calculate a second set of SVD values, such as $H_2=U_2S_2V_2^H$. The second set of SVD values may include a fourth matrix having left eigenvectors, such as $U_2$, a fifth matrix having diagonal eigenvalues, such as $S_2$, and a sixth matrix having a second Hermitian of right eigenvectors, such as $V_2^H$. Moreover, 804 may be performed by the component 199 in FIG. 9 or in FIG. 10.

At 806, the network node may communicate using a beamforming weight for an SLR precoder matrix associated with the first UE and the second UE based on the third matrix and the sixth matrix and not based on the second matrix and the fifth matrix. For example, 806 may be performed by the network node 504 in FIG. 5, which may communicate the one or more precoded transmissions 518 with the UE 502 and the UE 506 using a beamforming weight for an SLR precoder matrix, such as $W_{comb}=H_{comb}^H(H_{comb}H_{comb}^H+N_0I)^{-1}$, associated with the UE 502 and the UE 506 based on the third matrix and the sixth matrix and not based on the second matrix and the fifth matrix, such as $H_{comb}=[H_{eq,1}; H_{eq,2}]$ where $H_{eq,1}=V_1^H$ and $H_{eq,2}=V_2^H$. 806 may also be performed by the network node 604 in FIG. 6, which may communicate the one or more precoded transmissions 618 with the UE 602 and the UE 606 using a beamforming weight for an SLR precoder matrix, such as $W_{comb}=H_{comb}^H(H_{comb}H_{comb}^H+N_0I)^{-1}$, associated with the UE 502 and the UE 506 based on the third matrix and the sixth matrix and not based on the second matrix and the fifth matrix, such as $H_{comb}=[H_{eq,1}; H_{eq,2}]$ where $H_{eq,1}=V_1^H$ and $H_{eq,2}=V_2^H$. Moreover, 806 may be performed by the component 199 in FIG. 9 or in FIG. 10.

Figure 9:
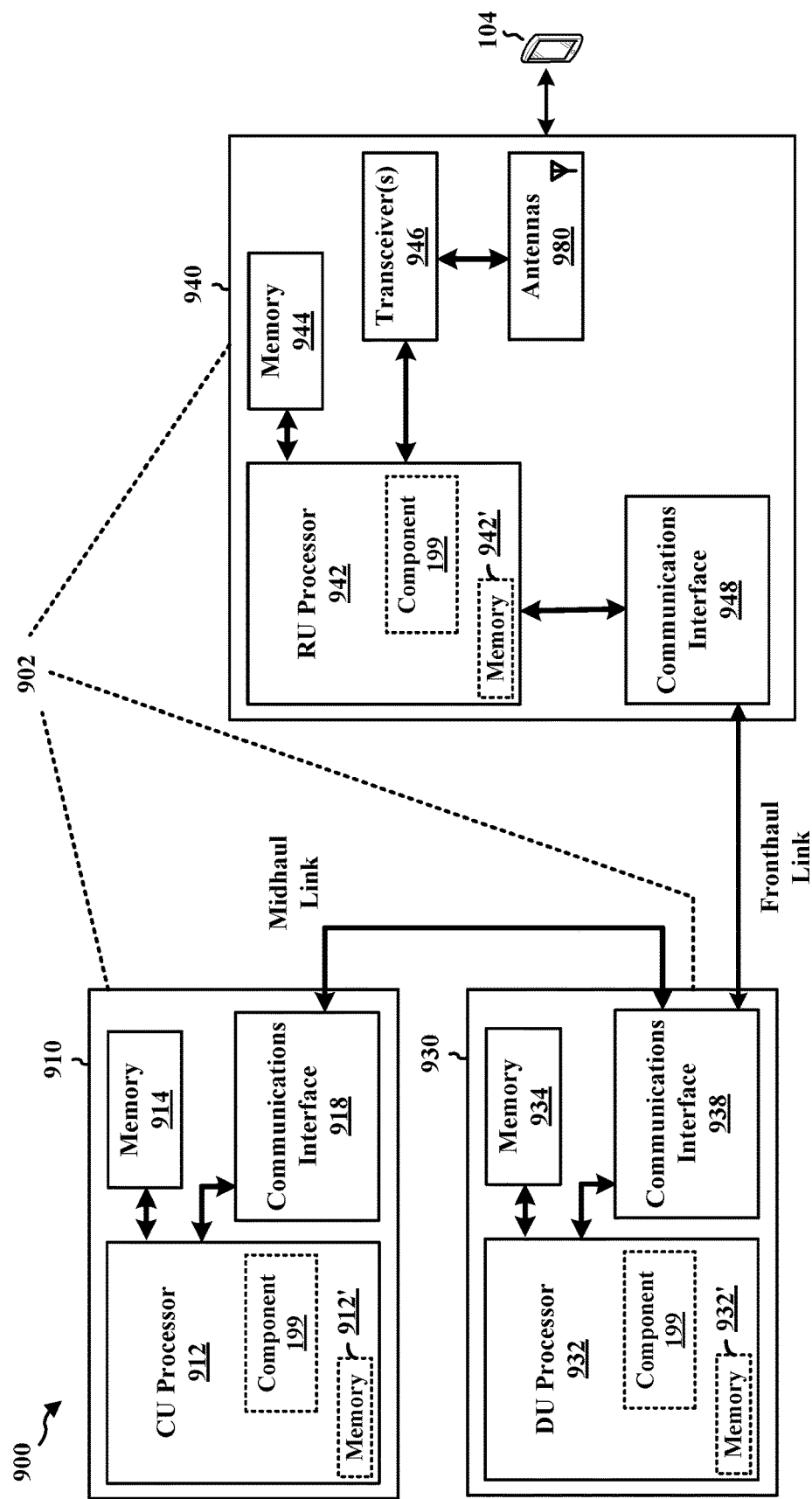
FIG. 9 is a diagram illustrating an example of a hardware implementation for an example network entity.

FIG. 9 is a diagram 900 illustrating an example of a hardware implementation for a network entity 902. The network entity 902 may be a BS, a component of a BS, or may implement BS functionality. The network entity 902 may include at least one of a CU 910, a DU 930, or an RU 940. For example, depending on the layer functionality handled by the component 199, the network entity 902 may include the CU 910; both the CU 910 and the DU 930; each of the CU 910, the DU 930, and the RU 940; the DU 930; both the DU 930 and the RU 940; or the RU 940. The CU 910 may include a CU processor 912. The CU processor 912 may include on-chip memory 912'. In some aspects, the CU 910 may further include additional memory modules 914 and a communications interface 918. The CU 910 communicates with the DU 930 through a midhaul link, such as an F1 interface. The DU 930 may include a DU processor 932. The DU processor 932 may include on-chip memory 932'. In some aspects, the DU 930 may further include additional memory modules 934 and a communications interface 938. The DU 930 communicates with the RU 940 through a fronthaul link. The RU 940 may include an RU processor 942. The RU processor 942 may include on-chip memory 942'. In some aspects, the RU 940 may further include additional memory modules 944, one or more transceivers 946, antennas 980, and a communications interface 948. The RU 940 communicates with the UE 104. The on-chip memory 912', 932', 942' and the additional memory modules 914, 934, 944 may each be considered a computer-readable medium/memory. Each computer-readable medium/memory may be non-transitory. Each of the processors 912, 932, 942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software. As discussed supra, the component 199 is configured to decompose a first channel of a first UE to calculate a first set of SVD values and may decompose a second channel of a second UE to calculate a second set of SVD values. The first SVD values may include a first matrix having left eigenvectors, a second matrix having diagonal eigenvalues, and a third matrix having a first Hermitian of right eigenvectors. The second SVD values may include a fourth matrix having left eigenvectors, a fifth matrix having diagonal eigenvalues, and a sixth matrix having a second Hermitian of right eigenvectors. The component 199 may be configured to communicate using a beamforming weight for an SLR precoder matrix associated with the first UE and the second UE based on the third matrix and the sixth matrix and not based on the second matrix and the fifth matrix. The component 199 may be within one or more processors of one or more of the CU 910, DU 930, and the RU 940. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 902 may include a variety of components configured for various functions. In one configuration, the network entity 902 includes means for decomposing a first channel of a first UE to calculate a first set of SVD values including a first matrix having left eigenvectors, a second matrix having diagonal eigenvalues, and a third matrix having a first Hermitian of right eigenvectors. The network entity 902 may include means for decomposing a second channel of a second UE to calculate a second set of SVD values including a fourth matrix having left eigenvectors, a fifth matrix having diagonal eigenvalues, and a sixth matrix having a second Hermitian of right eigenvectors. The network entity 902 may include means for communicating using a beamforming weight for a SLR precoder matrix associated with the first UE and the second UE based on the third matrix and the sixth matrix and not based on the second matrix and the fifth matrix. The network entity 902 may include means for receiving an SRS from the first UE. The network entity 902 may include means for decomposing the first channel of the first UE by decomposing the first channel of the first UE based on the SRS. The network entity 902 may include means for transmitting a CSI-RS to the second UE. The network entity 902 may include means for receiving PMI feedback from the second UE based on the CSI-RS. The network entity 902 may include means for decomposing the second channel of the second UE by decomposing the second channel of the second UE based on the PMI feedback. The network entity 902 may include means for receiving a second SRS from the second UE. The network entity 902 may include means for decomposing the second channel of the second UE by decomposing the second channel of the second UE based on the second SRS. The network entity 902 may include means for calculating the beamforming weight by concatenating the third matrix and the sixth matrix to calculate a combined equivalent channel of the first UE and the second UE. The network entity 902 may include means for calculating the beamforming weight by calculating the beamforming weight as a function of $H^H(HH^H+N_0I)^{-1}$. The means may be the component 199 of the network entity 902 configured to perform the functions recited by the means. As described supra, the network entity 902 may include the Tx processor 316, the Rx processor 370, and the controller/processor 375. As such, in one configuration, the means may be the Tx processor 316, the Rx processor 370, and/or the controller/processor 375 configured to perform the functions recited by the means.

Figure 10:
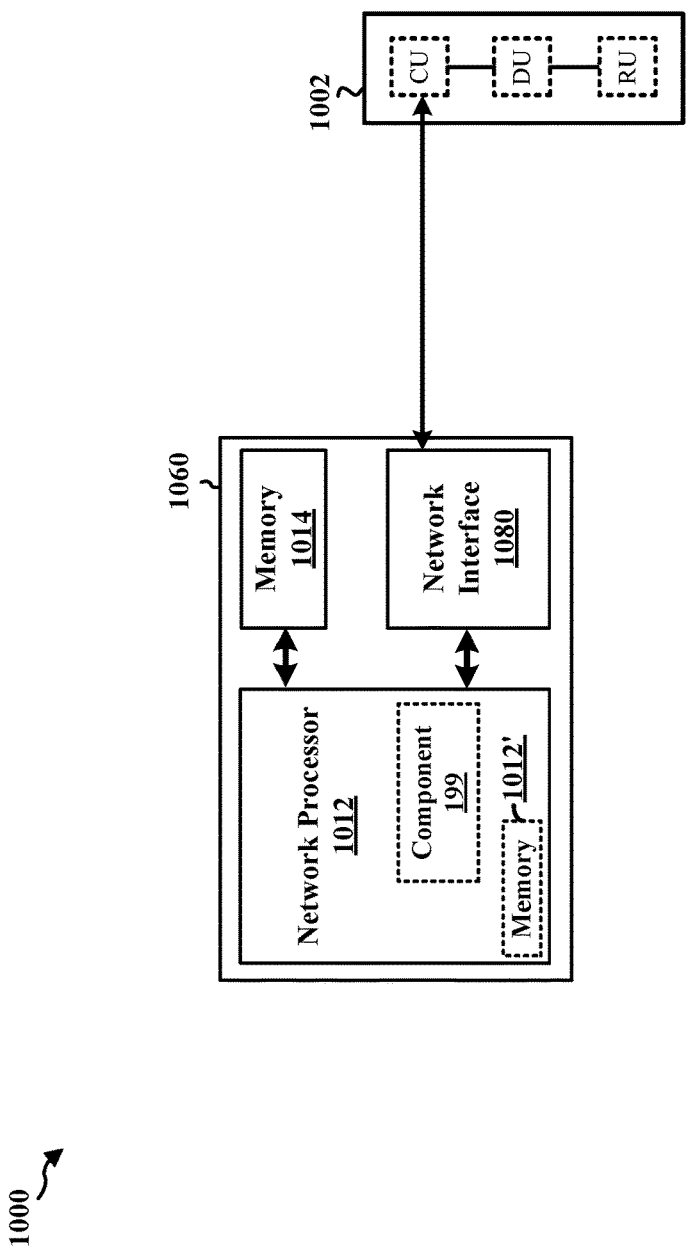
FIG. 10 is a diagram illustrating an example of a hardware implementation for an example network entity.

FIG. 10 is a diagram 1000 illustrating an example of a hardware implementation for a network entity 1060. In one example, the network entity 1060 may be within the core network 120. The network entity 1060 may include a network processor 1012. The network processor 1012 may include on-chip memory 1012'. In some aspects, the network entity 1060 may further include additional memory modules 1014. The network entity 1060 communicates via the network interface 1080 directly (e.g., backhaul link) or indirectly (e.g., through a MC) with the CU 1002. The on-chip memory 1012' and the additional memory modules 1014 may each be considered a computer-readable medium/memory. Each computer-readable medium/memory may be non-transitory. The processor 1012 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to decompose a first channel of a first UE to calculate a first set of SVD values and may decompose a second channel of a second UE to calculate a second set of SVD values. The first SVD values may include a first matrix having left eigenvectors, a second matrix having diagonal eigenvalues, and a third matrix having a first Hermitian of right eigenvectors. The second SVD values may include a fourth matrix having left eigenvectors, a fifth matrix having diagonal eigenvalues, and a sixth matrix having a second Hermitian of right eigenvectors. The component 199 may be configured to communicate using a beamforming weight for an SLR precoder matrix associated with the first UE and the second UE based on the third matrix and the sixth matrix and not based on the second matrix and the fifth matrix. The component 199 may be within the processor 1012. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1060 may include a variety of components configured for various functions. In one configuration, the network entity 1060 includes means for decomposing a first channel of a first UE to calculate a first set of SVD values including a first matrix having left eigenvectors, a second matrix having diagonal eigenvalues, and a third matrix having a first Hermitian of right eigenvectors. The network entity 1060 may include means for decomposing a second channel of a second UE to calculate a second set of SVD values including a fourth matrix having left eigenvectors, a fifth matrix having diagonal eigenvalues, and a sixth matrix having a second Hermitian of right eigenvectors. The network entity 1060 may include means for communicating using a beamforming weight for a SLR precoder matrix associated with the first UE and the second UE based on the third matrix and the sixth matrix and not based on the second matrix and the fifth matrix. The network entity 1060 may include means for receiving an SRS from the first UE. The network entity 1060 may include means for decomposing the first channel of the first UE by decomposing the first channel of the first UE based on the SRS. The network entity 1060 may include means for transmitting a CSI-RS to the second UE. The network entity 1060 may include means for receiving PMI feedback from the second UE based on the CSI-RS. The network entity 1060 may include means for decomposing the second channel of the second UE by decomposing the second channel of the second UE based on the PMI feedback. The network entity 1060 may include means for receiving a second SRS from the second UE. The network entity 1060 may include means for decomposing the second channel of the second UE by decomposing the second channel of the second UE based on the second SRS. The network entity 1060 may include means for calculating the beamforming weight by concatenating the third matrix and the sixth matrix to calculate a combined equivalent channel of the first UE and the second UE. The network entity 1060 may include means for calculating the beamforming weight by calculating the beamforming weight as a function of $H^H(HH^H+N_0I)^{-1}$. The means may be the component 199 of the network entity 1060 configured to perform the functions recited by the means.

The performance of MU-MIMO precoding based on an estimate of each channel based on the Hermitian of the right eigenvector may be better than an estimate of each channel based on both a matrix of diagonal eigenvalues and a matrix of the Hermitian of the right eigenvector. Such a system of precoding is more robust to changes in the channel from the time of precoder computation to the application of the precoder. Performing SVD on a channel of an NR SRS signal based on eigenvectors and not on eigenvalues not only optimizes the decomposition process, but allows such a channel to be combined with channels of other signals, such as PMI feedback of a CSI-RS. It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented. The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

The following aspects are illustrative only and may be combined with other aspects or teachings described herein, without limitation.

Aspect 1 is a method of wireless communication at a UE, where the method may include decomposing a first channel of a first UE to calculate a first set of SVD values including a first matrix having left eigenvectors, a second matrix having diagonal eigenvalues, and a third matrix having a first Hermitian of right eigenvectors. The method may include decomposing a second channel of a second UE to calculate a second set of SVD values including a fourth matrix having left eigenvectors, a fifth matrix having diagonal eigenvalues, and a sixth matrix having a second Hermitian of right eigenvectors. The method may include communicating using a beamforming weight for a SLR precoder matrix associated with the first UE and the second UE based on the third matrix and the sixth matrix and not based on the second matrix and the fifth matrix.

Aspect 2 is the method of aspect 1, where the method may include receiving an SRS from the first UE. Decomposing the first channel of the first UE may include decomposing the first channel of the first UE based on the SRS.

Aspect 3 is the method of aspect 2, where the method may include transmitting a CSI-RS to the second UE. The method may include receiving PMI feedback from the second UE based on the CSI-RS. Decomposing the second channel of the second UE may include decomposing the second channel of the second UE based on the PMI feedback.

Aspect 4 is the method of aspect 2, where the method may include receiving a second SRS from the second UE. Decomposing the second channel of the second UE may include decomposing the second channel of the second UE based on the second SRS.

Aspect 5 is the method of any of aspects 1 to 4, where the third matrix may be associated with a first spatial signature of the first UE and the sixth matrix may be associated with a second spatial signature of the second UE.

Aspect 6 is the method of any of aspects 1 to 5, where calculating the beamforming weight may include concatenating the third matrix and the sixth matrix to calculate a combined equivalent channel of the first UE and the second UE.

Aspect 7 is the method of aspect 6, where calculating the beamforming weight may include calculating the beamforming weight as a function of $H^H(HH^H+N_0I)^{-1}$ H may include the combined equivalent channel of the first UE and the second UE. $H^H$ may include a third Hermitian of H. $N_0$ may include a calculated noise value. I may include an identity matrix.

Aspect 8 is the method of any of aspects 1 to 7, where the first set of SVD values may decompose the first channel to a function of $U_1S_1V_1^H$. $U_1$ may include the first matrix having left eigenvectors. $S_1$ may include the second matrix having diagonal eigenvalues. $V_1^H$ may include a Hermitian of the third matrix having right eigenvectors.

Aspect 9 is an apparatus for wireless communication, including: a memory; and at least one processor coupled to the memory and, based at least in part on information stored in the memory, the at least one processor is configured to implement any of aspects 1 to 9.

Aspect 10 is the apparatus of aspect 9, further including at least one of an antenna or a transceiver coupled to the at least one processor.

Aspect 11 is an apparatus for wireless communication including means for implementing any of aspects 1 to 9.

Aspect 12 is a computer-readable medium (e.g., a non-transitory computer-readable medium) storing computer executable code, where the code when executed by a processor causes the processor to implement any of aspects 1 to 9.

What is claimed is:

1. An apparatus for wireless communication at a network node, comprising:

at least one memory; and at least one processor coupled to the at least one memory and, based at least in part on information stored in the at least one memory, the at least one processor is configured to:

decompose a first channel of a first user equipment (UE) to calculate a first set of singular-value decomposition (SVD) values comprising a first matrix having a first set of left eigenvectors, a second matrix having a first set of diagonal eigenvalues, and a third matrix having a first Hermitian of a first set of right eigenvectors;

decompose a second channel of a second UE to calculate a second set of SVD values comprising a fourth matrix having a second set of left eigenvectors, a fifth matrix having a second set of diagonal eigenvalues, and a sixth matrix having a second Hermitian of a second set of right eigenvectors; and communicate using a beamforming weight for a signal-to-leakage ratio (SLR) precoder matrix associated with the first UE and the second UE based on the third matrix and the sixth matrix and not based on the second matrix and the fifth matrix.

2. The apparatus of claim 1, wherein the at least one processor is further configured to:

receive a sounding reference signal (SRS) from the first UE, wherein, to decompose the first channel of the first UE, the at least one processor is configured to decompose the first channel of the first UE based on the SRS.

3. The apparatus of claim 2, wherein the at least one processor is further configured to:

transmit a channel state information (CSI) reference signal (CSI-RS) to the second UE; and receive precoding matrix indicator (PMI) feedback from the second UE based on the CSI-RS, wherein, to decompose the second channel of the second UE, the at least one processor is configured to decompose the second channel of the second UE based on the PMI feedback.

4. The apparatus of claim 2, wherein the at least one processor is further configured to:

receive a second SRS from the second UE, wherein, to decompose the second channel of the second UE, the at least one processor is configured to decompose the second channel of the second UE based on the second SRS.

5. The apparatus of claim 1, wherein the third matrix is associated with a first spatial signature of the first UE and the sixth matrix is associated with a second spatial signature of the second UE.

6. The apparatus of claim 1, wherein, to calculate the beamforming weight, the at least one processor is configured to concatenate the third matrix and the sixth matrix to calculate a combined equivalent channel of the first UE and the second UE.

7. The apparatus of claim 6, wherein, to calculate the beamforming weight, the at least one processor is further configured to calculate the beamforming weight as a function of $H^H(HH^H+N_0I)^{-1}$, wherein H comprises the combined equivalent channel of the first UE and the second UE, $H^H$ comprises a third Hermitian of H, $N_0$ comprises a calculated noise value, and I comprises an identity matrix.

8. The apparatus of claim 1, wherein the first set of SVD values decompose the first channel to a function of $U_1S_1V_1^H$, where $U_1$ comprises the first matrix having the first set of left eigenvectors, $S_1$ comprises the second matrix having the first set of diagonal eigenvalues, and $V_1^H$ comprises the third matrix having the first Hermitian of the first set of right eigenvectors.

9. The apparatus of claim 1, further comprising a transceiver coupled to the at least one processor, wherein communicating using the beamforming weight comprises communicating, via the transceiver, using the beamforming weight.

10. A method of wireless communication at a network node, comprising:

decomposing a first channel of a first user equipment (UE) to calculate a first set of singular-value decomposition (SVD) values comprising a first matrix having a first set of left eigenvectors, a second matrix having a first set of diagonal eigenvalues, and a third matrix having a first Hermitian of a first set of right eigenvectors;

decomposing a second channel of a second UE to calculate a second set of SVD values comprising a fourth matrix having a second set of left eigenvectors, a fifth matrix having a second set of diagonal eigenvalues, and a sixth matrix having a second Hermitian of a second set of right eigenvectors; and communicating using a beamforming weight for a signal-to-leakage ratio (SLR) precoder matrix associated with the first UE and the second UE based on the third matrix and the sixth matrix and not based on the second matrix and the fifth matrix.

11. The method of claim 10, further comprising:

receiving a sounding reference signal (SRS) from the first UE, wherein decomposing the first channel of the first UE comprises decomposing the first channel of the first UE based on the SRS.

12. The method of claim 11, further comprising:

transmitting a channel state information (CSI) reference signal (CSI-RS) to the second UE; and receiving precoding matrix indicator (PMI) feedback from the second UE based on the CSI-RS, wherein decomposing the second channel of the second UE comprises decomposing the second channel of the second UE based on the PMI feedback.

13. The method of claim 11, further comprising:

receiving a second SRS from the second UE, wherein decomposing the second channel of the second UE comprises decomposing the second channel of the second UE based on the second SRS.

14. The method of claim 10, wherein the third matrix is associated with a first spatial signature of the first UE and the sixth matrix is associated with a second spatial signature of the second UE.

15. The method of claim 10, wherein calculating the beamforming weight comprises concatenating the third matrix and the sixth matrix to calculate a combined equivalent channel of the first UE and the second UE.

16. The method of claim 15, wherein calculating the beamforming weight comprises calculating the beamforming weight as a function of $H^H(HH^H+N_0I)^{-1}$, wherein H comprises the combined equivalent channel of the first UE and the second UE, $H^H$ comprises a third Hermitian of H, $N_0$ comprises a calculated noise value, and I comprises an identity matrix.

17. The method of claim 10, wherein the first set of SVD values decompose the first channel to a function of $U_1S_1V_1^H$, where $U_1$ comprises the first matrix having the first set of left eigenvectors, $S_1$ comprises the second matrix having the first set of diagonal eigenvalues, and $V_1^H$ comprises the third matrix having the first Hermitian of the first set of right eigenvectors.

18. An apparatus for wireless communication at a network node, comprising:
- means for decomposing a first channel of a first user equipment (UE) to calculate a first set of singular-value decomposition (SVD) values comprising a first matrix having a first set of left eigenvectors, a second matrix having a first set of diagonal eigenvalues, and a third matrix having a first Hermitian of a first set of right eigenvectors;
- means for decomposing a second channel of a second UE to calculate a second set of SVD values comprising a fourth matrix having a second set of left eigenvectors, a fifth matrix having a second set of diagonal eigenvalues, and a sixth matrix having a second Hermitian of a second set of right eigenvectors; and
- means for communicating using a beamforming weight for a signal-to-leakage ratio (SLR) precoder matrix associated with the first UE and the second UE based on the third matrix and the sixth matrix and not based on the second matrix and the fifth matrix.

19. The apparatus of claim 18, further comprising:
- means for receiving a sounding reference signal (SRS) from the first UE, wherein decomposing the first channel of the first UE comprises decomposing the first channel of the first UE based on the SRS.

20. The apparatus of claim 19, further comprising:
- means for transmitting a channel state information (CSI) reference signal (CSI-RS) to the second UE; and
- means for receiving precoding matrix indicator (PMI) feedback from the second UE based on the CSI-RS, wherein decomposing the second channel of the second UE comprises decomposing the second channel of the second UE based on the PMI feedback.

21. The apparatus of claim 19, further comprising:
- means for receiving a second SRS from the second UE, wherein decomposing the second channel of the second UE comprises decomposing the second channel of the second UE based on the second SRS.

22. The apparatus of claim 18, wherein the third matrix is associated with a first spatial signature of the first UE and the sixth matrix is associated with a second spatial signature of the second UE.

23. The apparatus of claim 18, wherein calculating the beamforming weight comprises concatenating the third matrix and the sixth matrix to calculate a combined equivalent channel of the first UE and the second UE.

24. The apparatus of claim 23, wherein the means for calculating the beamforming weight comprises means for calculating the beamforming weight as a function of $H^H(HH^H+N_0I)^{-1}$, wherein H comprises the combined equivalent channel of the first UE and the second UE, $H^H$ comprises a third Hermitian of H, $N_0$ comprises a calculated noise value, and I comprises an identity matrix.

25. The apparatus of claim 18, wherein the first set of SVD values decompose the first channel to a function of $U_1S_1V_1^H$, where $U_1$ comprises the first matrix having the first set of left eigenvectors, $S_1$ comprises the second matrix having the first set of diagonal eigenvalues, and $V_1^H$ comprises the third matrix having the first Hermitian of the first set of right eigenvectors.

26. The apparatus of claim 18, further comprising a transceiver, wherein the means for communicating using the beamforming weight comprises means for communicating, via the transceiver, using the beamforming weight.

27. A non-transitory computer-readable medium storing computer executable code at a network node, the code when executed by a processor causes the processor to:
- decompose a first channel of a first user equipment (UE) to calculate a first set of singular-value decomposition (SVD) values comprising a first matrix having a first set of left eigenvectors, a second matrix having a first set of diagonal eigenvalues, and a third matrix having a first Hermitian of a first set of right eigenvectors;
- decomposing a second channel of a second UE to calculate a second set of SVD values comprising a fourth matrix having a second set of left eigenvectors, a fifth matrix having a second set of diagonal eigenvalues, and a sixth matrix having a second Hermitian of a second set of right eigenvectors; and
- communicating using a beamforming weight for a signal-to-leakage ratio (SLR) precoder matrix associated with the first UE and the second UE based on the third matrix and the sixth matrix and not based on the second matrix and the fifth matrix.

28. The non-transitory computer-readable medium of claim 27, wherein the code when executed by the processor causes the processor to:
- receive a sounding reference signal (SRS) from the first UE, wherein decomposing the first channel of the first UE comprises decomposing the first channel of the first UE based on the SRS;
- transmit a channel state information (CSI) reference signal (CSI-RS) to the second UE; and
- receive precoding matrix indicator (PMI) feedback from the second UE based on the CSI-RS, wherein decomposing the second channel of the second UE comprises decomposing the second channel of the second UE based on the PMI feedback.

29. The non-transitory computer-readable medium of claim 27, wherein the code when executed by the processor causes the processor to:
- receive a sounding reference signal (SRS) from the first UE, wherein decomposing the first channel of the first UE comprises decomposing the first channel of the first UE based on the SRS; and
- receive a second SRS from the second UE, wherein decomposing the second channel of the second UE comprises decomposing the second channel of the second UE based on the second SRS.

30. The non-transitory computer-readable medium of claim 27, wherein the first set of SVD values decompose the first channel to a function of $U_1S_1V_1^H$, where $U_1$ comprises the first matrix having the first set of left eigenvectors, $S_1$ comprises the second matrix having the first set of diagonal eigenvalues, and $V_1^H$ comprises the third matrix having the first Hermitian of the first set of right eigenvectors.

* * * * *